June 9, 1953            J. J. BYBERG            2,641,412
FEED MIXER AND GRINDER
Filed May 23, 1951            2 Sheets-Sheet 1
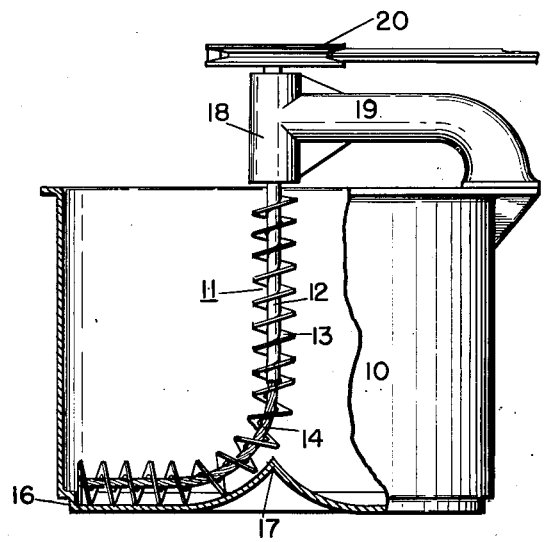
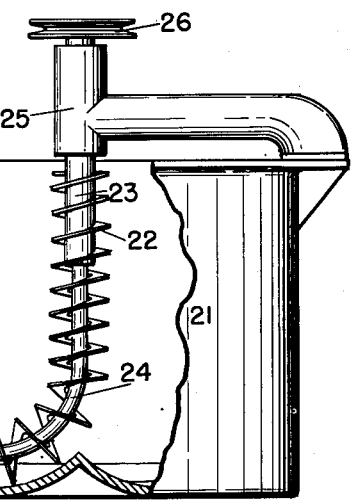
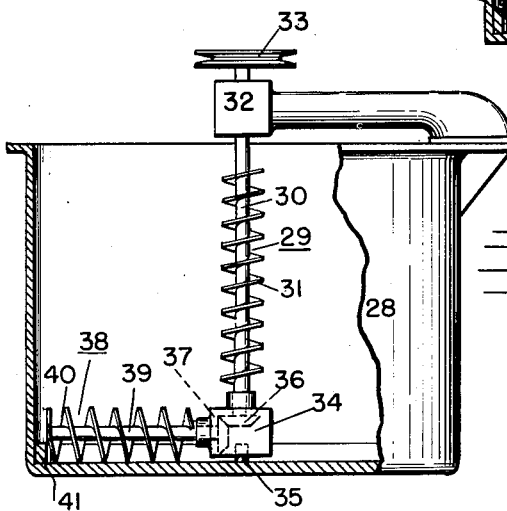
*INVENTOR.*
JONAS J BYBERG
BY *F. R. Geisler*
ATTORNEY June 9, 1953     J. J. BYBERG     2,641,412
FEED MIXER AND GRINDER
Filed May 23, 1951     2 Sheets-Sheet 2
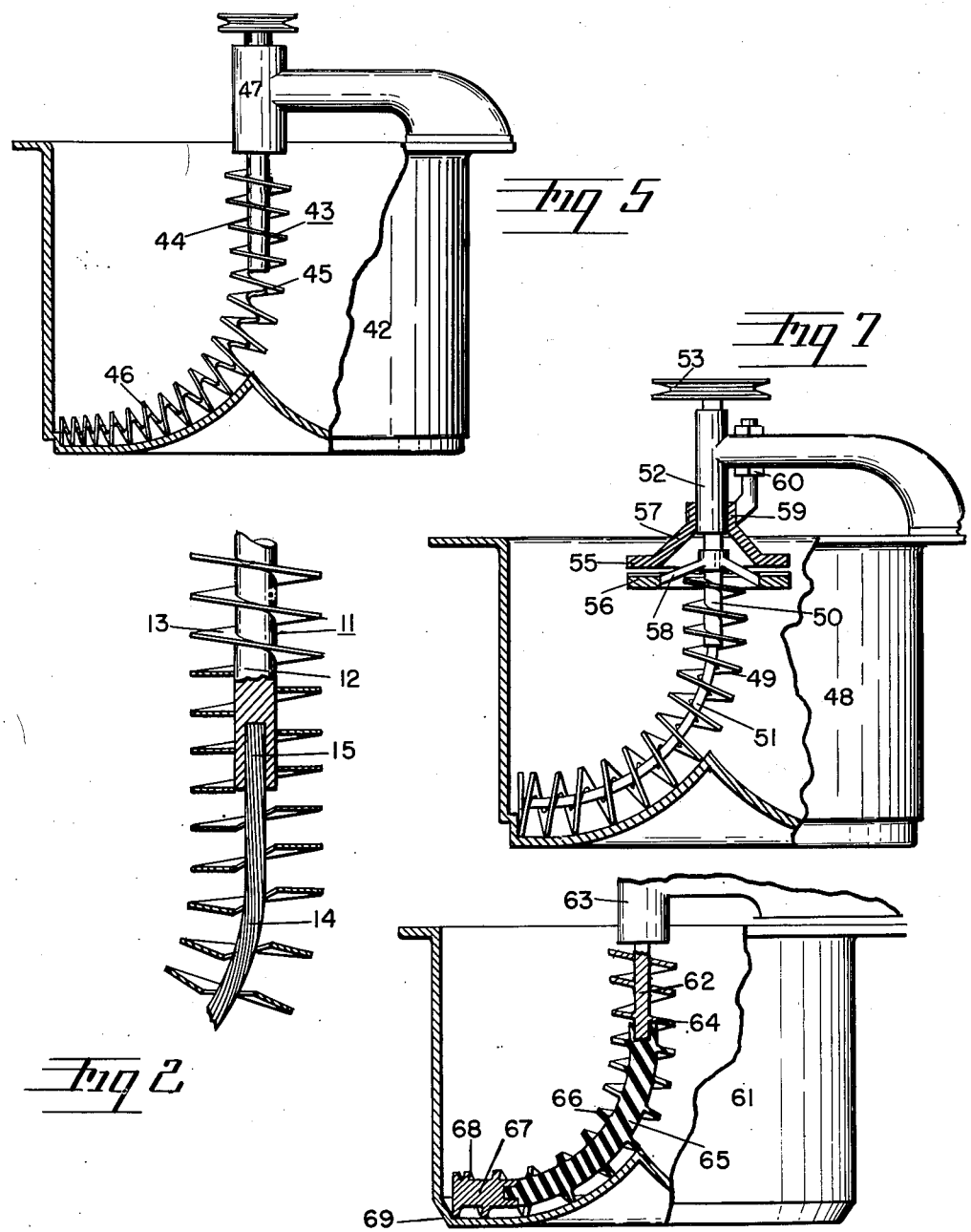
INVENTOR.
JONAS J. BYBERG
ATTORNEY Patented June 9, 1953

2,641,412

UNITED STATES PATENT OFFICE 2,641,412

FEED MIXER AND GRINDER

Jonas J. Byberg, Silverton, Oreg.

Application May 23, 1951, Serial No. 227,862

14 Claims. (Cl. 241—98)

This invention relates in general to the mixing, or to the grinding and mixing, of feed for poultry and other farm animals.

As is well known, in modern farming it is customary to purchase various specially prepared feed ingredients from suppliers and to mix such ingredients with the grain or other food materials produced on the farm, the mixed mixtures furnishing a more effective, more nutritive or better balanced animal diet. The mixing is generally performed by power driven mixers, of which there are several on the market, but the purchase and installation of these customary mixers not only entails relatively considerable expense in the case of small farms, but such devices generally require larger motors for their operation than are customarily used on small farms, which also may necessitate special wiring for the carrying of the power load, or on the other hand, may require expensive reduction drives.

An object of the present invention is to provide an improved feed mixer and grinder which will require such a small amount of horse power for its operation that the ordinary fractional horse power motor, of the type commonly employed in farm households, can be used, thus eliminating the necessity for purchasing a special or larger motor or for any special wiring to take care of the electric current load.

Another object of the invention is to provide a farm feed mixer which will be readily portable, and which can be set up in any conventional location, as for example, by a storage bin or at the place where the feeding is to be done, so as to enable the feeding to be done directly from the mixer.

An additional object of the invention is to provide a feed mixer, or combined mixer and grinder, which will require very little space in itself, thus eliminating the necessity of altering or adding to the buildings on ordinary small farms in order to house the feed mixer.

Conventional feed mixers generally include a motor-driven auger of relatively large diameter, rotating on a vertical axis within a mixing tank and concentric with respect to the tank. The lower portion of the tank in such mixers is usually made conical in shape so as to taper to a central discharge outlet at the bottom. Rotation of the auger lifts the feed contacted by the auger to the top of the tank from whence the feed moves outwardly and downwardly in the tank, again to be lifted by the auger. In order that this form of circulation of the feed in the mixer may be extensive enough to prevent bridging of the contents of the tank at the lower end of the cone, the diameter of the auger is necessarily relatively quite large. A large auger requires more power for its rotation at a given speed than a small auger; hence a large motor is usually required or else a relatively costly reduction drive is needed for operating the mixer from a smaller motor. Another object of the invention is to make possible the use of a small auger, which can be operated at relatively high speed and requiring less costly drive and less horsepower, without having any bridging of the contents of the mixer taking place in the mixer with the small auger.

The use of a conical bottom in the conventional mixing tank makes it quite high. As a result it is ordinarily necessary to provide some means for lifting the grain to be dumped into the top of the feed mixer. A further object of the present invention is to provide a practical feed mixer, the top of which need not be very high above the floor or ground, so that there will be no necessity for any special elevating means for lifting the sacked grain for the dumping of the same into the mixer.

A similar object is to have a mixer from the top of which the mixed feed can, when desired, easily be shoveled or baled out and in such manner fed directly to the farm animals without requiring any sacking.

In brief a main object of my invention is to have a feed mixer with a mixing auger in which the diameter of the auger will be relatively small in comparison with the interior diameter of the mixing tank and yet will be so arranged as to enable the mixing to be done as efficiently and thoroughly as in the conventional mixers requiring the auger to be relatively large in comparison with the interior diameter of the mixing tank. By being able to employ a relatively small diameter auger, less power for rotating the auger is required and also the mixing can take place in a tank which can be lower in height and larger in diameter, with the resulting advantages above indicated.

An additional object is to provide a combination mixer and grinder which will be self-feeding and which will require no special attention during the combined mixing and grinding operation.

The manner in which these objects are attained with my invention and in particular the manner in which the driven mixing auger in my improved feed mixer is constructed, and the manner in which the auger functions, will be understood from the following brief description with reference to the accompanying drawings, in which:

Fig. 1 is an elevation, partly in section, of a mixing tank and a driven feed-mixing auger designed for carrying out my invention;

Fig. 2 is a fragmentary elevation, partly in section, of the auger of Fig. 1, but drawn to a larger scale;

Fig. 3 is an elevation, partly in section, similar to Fig. 1, but illustrating a modified means of carrying out my invention;

Fig. 4 is an elevation, partly in section, of a mixing tank in which a double or compound auger is employed for carrying out my invention;

Fig. 5 is an elevation, partly in section, of a mixing tank having an auger in the form of a helical spring formed with a uniformly decreasing diameter;

Fig. 6 is an elevation, partly in section, of a mixing tank in which another modified form of flexible auger is shown as a means of carrying out my invention; and Fig. 7 is an elevation, partly in section, of the mixing tank having an auger somewhat similar to that illustrated in Fig. 3 but with the addition of grinding means positioned adjacent the top discharging end of the auger so that the contents of the tank, as the contents are lifted to the top by the action of the auger, will also be subjected to a grinding action.

Referring first to Fig. 1, the cylindrical mixing tank 10, which is open at the top, is provided with a mixing auger indicated as a whole by the reference character 11. This auger 11 is of special construction and consists of a spiral blade 13 mounted on a core. The core comprises two sections, namely an upper vertical section 12 and a lower flexible and curving section 14, the two sections being joined together so as to form a continuous core for the spiral blade 13. The upper core section 12 consists of a vertical shaft positioned axially with respect to the cylindrical wall of the tank 10 with the lower end of the vertical core shaft terminating a spaced distance above the tank bottom. The portion of the spiral auger blade 13 which is in contact with this upper core shaft 12 is secured to the shaft. The vertical core shaft 12 extends up beyond the top terminus of the auger blade 13 and up beyond the horizontal plane of the top rim of the tank 10, and the upper end of the vertical core shaft 12 is rotatable within suitable bearings (not shown) supported in a bearing sleeve 18. The bearing sleeve 18 in turn is supported by a bracket 19, rigidly mounted on the tank and extending upwardly and thence inwardly from the top of the tank wall as indicated. A pulley 20 is secured to the top end of the vertical core shaft 12 and is adapted to be connected by a drive belt to an electric motor.

The lower flexible core section 14 (see also Fig. 2) may be formed from a piece of flexible, resilient wire cable with the upper end 15 secured in a recess provided in the bottom end of the upper core shaft 12, or the flexible core section 14 may be made of any other suitable springy material and connected to the upper core shaft 12 in any other suitable manner. The flexible core section 14 is made of proper length to extend from the bottom end of the upper core shaft 12 to the bottom of the cylindrical tank wall, as shown in Fig. 1, with a considerable portion of the lower end extending horizontal and parallel to the bottom of the tank. The tank bottom is formed with a central raised conical portion 17 so that the tank bottom may conform to the curvature of the adjacent portion of the core section 14 and consequently of the lower portion of the auger.

At its lower end the spiral auger blade 13 preferably is made to terminate on itself, thus ending in a more or less circular blade with a horizontal axis, which end blade engages the bottom portion of the wall of the tank 10. The cylindrical wall of the tank 10 has a rolled-in portion or reduced diameter portion 16 at the bottom which extends upwardly not more than half the height of the circular blade at the bottom terminus of the auger. The purpose of this will be presently explained.

The spiral auger blade 13 may be made of a thin flat steel spring strip turned or wound edgewise so as to hold a fixed radius of curvature and then be maintained in the spiral formation, or it may be formed of molded rubber or other materials possessing flexibility, resiliency, and suitable wearing qualities.

As will now be apparent from Fig. 1, the bending or flexing of the lower portion of the auger will cause the auger to bear against the tank bottom and exert a downward pressure on the tank bottom as well as to exert some end pressure against the side wall of the tank at the bottom. This together with the torque resistance of the flexing member will cause that portion of the auger which is in contact with the tank bottom to crawl around the tank in addition to turning on its axis. The reduced diameter portion 16 at the bottom of the side wall of the tank assists the crawling action of the auger. Only the lower half of the blade at the terminus of the auger is in engagement with the reduced diameter portion and the upper half of the blade does not actually engage the tank wall inasmuch as engagement with the upper half of the blade would offer more resistance to the blade movement and consequently to the crawling action of the lower portion of the auger. The turning of the auger on its own axis produces the customary result of moving the material in the tank, as it comes into direct contact with the spiral auger blade, upwardly with the auger to the top of the tank at the central portion. However, in addition, the crawling of the lower flexible portion of the auger around the bottom of the tank causes this portion of the auger constantly to push into a wall of the material resting on the tank bottom. As a result, any possible "bridging" of the compacted material surrounding the auger channel in the bottom of the tank is entirely prevented. If the auger did not move around the bottom of the tank but remained in a fixed location in the tank while turning on its own axis, in all probability the feed material to be mixed would compact and "bridge" and thus cause a hollow clear channel to be formed in which the auger would turn without causing any further movement or circulation of the material. The similar forming of a hollow channel is what has actually happened in the past when vertical augers of relatively small diameters have previously been used in mixing tanks, and this is the reason why it has been considered necessary in the feed mixing machines in current general use to have the auger of relatively large diameter. The fact that with my invention a small diameter auger can be used, and complete movement of the material throughout every portion of the tank assured, enables the auger to be driven by a belt directly from a small horse power motor, without any costly reduction drives, or without the employment of a higher horse power motor;

which would be necessitated by a larger diameter auger. Furthermore, such a small diameter auger can be manufactured at less cost than the customary large diameter augers.

In Fig. 3 the mixing tank 21 similarly has a mixing auger of relatively small diameter functioning similarly but of slightly modified construction. The auger core comprises two sections, namely an upper vertical core shaft 23, at least the lower portion of which is tubular, and a lower core section 24 consisting of a rigid rod or bar formed so as to have an upper vertical portion and a lower horizontal portion and an intermediate curved portion of the desired radius of curvature. The upper end of this curved rod or bar, comprising the lower core section 24 is inserted in the lower end of the upper vertical core shaft 23 and is free to turn therein. The spiral auger blade 22 is secured to the upper vertical core shaft 23, but, although extending over and around the lower core section 24 is not secured to the lower core section. The upper core shaft 23 is supported for rotation in the bearing sleeve 25 and a drive pulley 26 is secured to the upper end of the core shaft. As a result of this construction rotation of the upper core shaft 23 will cause the spiral auger blade 22 to turn on its own axis. However, as the auger blade 22 turns on its axis it will also crawl around the bottom of the tank and in so doing will carry the lower core section 24 with it. The purpose of the lower core section 24, as will now be evident, is to keep the spiral auger blade in the proper curved formation and in such formation the lower portion of the spiral auger blade will always press against the bottom of the tank with which it comes into contact and, if made long enough, will also exert end pressure against the cylindrical tank wall at the tank bottom. The result is the same as already described with reference to Fig. 1. The rotation of the auger blade and the action of the lower portion of the spiral blade in crawling around the bottom of the tank will cause every particle of the feed mixture in the tank sooner or later to be brought into contact with the auger blade.

In Fig. 3 a ring 27 is shown in the bottom of the tank 21. The lower extremity of the spiral auger blade exerts an end thrust against the inside of the ring 27 and the auger blade preferably is made longer than might otherwise be necessary so that an appreciable end thrust of this nature will always be maintained. The height of the ring is not greater than one-half the diameter of the end of the auger. The ring not only aids in promoting the crawling action of the auger around the tank bottom and thus takes the place of the reduced diameter portion 16 of the tank in Fig. 1, but also prevents the possibility of any wear at the bottom portion of the cylindrical tank wall as a result of the end thrust exerted by the auger.

A slightly more complicated auger mechanism, but which might be preferred under some circumstances, and with which the principle of my invention can also be successfully carried out, is illustrated in Fig. 4. In this modified construction a compound or dual auger is used which comprises a vertical auger indicated in general by the reference character 29 and a related horizontal auger indicated in general by the reference character 38. The vertical auger portion 29 extends from the bottom to the top of the tank 28 and is concentric with the cylindrical wall of the tank, and this portion of the auger consists of a rigid shaft 30, serving as the vertical auger core, and a spiral auger blade 31 secured to this core shaft 30. The shaft 30 extends above the top of the tank, is supported by bearing sleeve 32, and has the customary drive pulley 33 secured to its top end. The bottom end of the core shaft 30 extends into the top of a closed gear box 34 and a beveled gear 36 is secured to the bottom end of the core shaft 30 within the gear box 34. The gear box 34 itself is rotatably supported on the tank bottom at the center by a suitable bearing mounting indicated at 35.

The second or horizontal auger also comprises a rigid core shaft 39 and a spiral auger blade 40 secured to the shaft 39. This portion of the composite or dual auger extends from the gear box 34 to the cylindrical wall of the tank on the tank bottom. The inner end of the auger shaft 39 extends into the gear box 34, being rotatably mounted in the side wall of the gear box, and has a beveled gear 37 secured to its inner end which meshes with the beveled gear 36. The outer end of the horizontal or lower auger 38 bears against the ring 41, or, if the ring is omitted in the construction, bears against the cylindrical tank wall at the bottom.

Rotation of the vertical auger 29, producing rotation of the meshing gears 36 and 37, causes rotation of the bottom or horizontal auger 38, and as the latter rotates it will also crawl around the tank bottom, causing the gear box 34 to turn slowly to accommodate such crawling motion. The material in the bottom of the tank, as it is contacted by the bottom auger 38, is moved along to the center of the tank where it then comes into contact with the vertical auger 29. The bottom of the tank, instead of extending in a horizontal plane, could if preferable slope downwardly from the center to the outer tank wall, the meshing gears 36 and 37 being modified accordingly, and of course other modifications could be made in the construction. Small diameter augers are all that are required, and thus only a moderate amount of power is consumed in operating this dual auger combination.

Variations in any of the blades of the augers which I have shown might be made. For example, Fig. 5 illustrates my device with an auger constructed without any lower core, using a helical spring of decreasing diameter, pitch, or resistance to flexing, or a combination thereof. In this figure the auger 43 in the tank 42 comprises a spiral auger blade 45 fastened to a vertical core shaft 44 mounted in the bearing support 47, the lower portion 46 of the blade 45 being flexible. However, the auger blade 45, instead of being uniform in diameter throughout the entire length of the auger, may decrease in diameter from top to bottom and also the "lead" or pitch of the auger blade may be made to become finer nearer its lower terminus as illustrated. One advantage of the finer "lead" at the bottom of the auger is that the feed being mixed will be moved with increased rapidity along the inner and upper portions of the auger, and since the movement of the feed from the bottom extremity of the auger will be insufficient to take the place of the more rapidly moving feed nearer the center, the feed will also be drawn in from other points nearer the center of the tank, thus varying the circulation and producing a better mixing action.

The spiral auger blade 45 may also be made increasingly flexible towards its lower terminus. This can be accomplished by a tapering or reduction of the cross section of the metal strip from which the auger blade is formed, as well as by varying the diameter and pitch of the blade. Increasing the flexibility has the obvious advantage of enabling the auger gradually to assume a truer curvature or bend as it presses down against the tank bottom, and reduces the crystallization and thus increases the life of the auger blade by enabling the flexing of the blade to be distributed more uniformly.

In Fig. 6 the modified composite auger in the tank 61 consists of an upper vertical shaft 62, supported in the bearing 63. An auger blade 64 is secured on the shaft 62. The lower end of the shaft 62 is firmly secured to the top of a flexible auger section 65, formed of molded rubber or other suitable flexible resilient material. This molded auger section is formed with an auger blade 66 which preferably decreases in width from the top to the bottom of the auger section as shown. A third auger section 67 is secured to the bottom end of the flexible section 65. This third section is preferably made of heavy metal or other material of sufficient weight to hold the bottom of the intermediate flexible section 65 down and of sufficient weight to prevent the third section 67 from having any tendency to crawl upwardly from the tank bottom. It will be noted that the auger blade 68 of this third or bottom section 67 increases in pitch from the outer bottom end until the auger section 67 joins the intermediate section 65. This increase in pitch of the auger blade, causing the engaged material to move faster along the auger section, cooperates with the increasing width of the auger blade (or increasing depth of the thread) in the second auger section 65 to prevent any tendency for the feed material near the center of the tank to be moved less rapidly than at the bottom of the outer wall of the tank. The use of a heavy or weighted third auger section 67 enables a very flexible middle section 65 to be included in the composite auger. This is in contrast to the auger of Fig. 1 in which the resistance to flexing of the auger core holds the auger blade down on the tank bottom. In Fig. 6 the bottom of the side wall of the tank 61 slopes inwardly, as shown at 69, so that only the lower portion of the outer extremity of the blade 68 engages the side wall. This serves the same purpose as the reduced diameter portion 16 of the tank in Fig. 1, or the ring 27 in Fig. 3, in facilitating the crawling action of the engaging auger section.

When, as is often the case, grinding as well as mixing of the feed is desired, this is easily accomplished with any of the mixing augers I have described. For example, in Fig. 7 a combined mixer and grinder is shown installed in the tank 48, the mixing auger shown in this figure being somewhat similar to that previously described with reference to Fig. 3, although any of the mixing augers which I have indicated as capable of carrying out my invention may be employed. Thus the mixing auger in this figure is shown as consisting of the spiral auger blade 49 secured to an upper core shaft 50 and extending over a lower core 51 which has its upper end freely mounted in the lower end of the upper core shaft 50. The upper core shaft 50 is rotatably supported in the bearing sleeve 52 and is driven by the pulley 53. A spider 58, secured to the core shaft 50, carries a grinding ring 56. An adjustable spider 57, axially slidable on the bearing sleeve 52, but prevented by a suitable keyway or other means from rotating on the sleeve 52, supports a cooperating grinding ring 55. As the mixed feed leaves the top of the auger blade 49 it passes through the spider 58 and thence between the cooperating grinding rings 56 and 55. Vertical adjustment of the upper spider 57, and consequent relative adjustment of the two grinding rings 55 and 56, is secured by adjustment of the bar 59 by which the upper spider 57 is suspended. The bar 59 extends through a bracket 60 and is held secured therein by clamping nuts, the adjustment of which enables the bar 59, and with it the spider 57 and ring 55 to be raised or lowered.

Minor variations could be made in the different examples of my mixer which I have illustrated. The auger and auger core, as previously mentioned, could be made flexible throughout the extent of the auger. The lower section of the auger core, instead of being of flexible material, could comprise short rigid sections with flexible joints, resulting in the same general auger shape and permitting the same general functioning of the auger. The auger can be of increasing outer diameter from bottom to top, either by having a core of increasing diameter or having the auger blade of increasing width, or the auger blade can increase in pitch from bottom to top or any combination of such arrangement can be used so that the feed will move with increased rapidity as it proceeds upwardly. But, in any event, it is necessary in the proper carrying out of my invention that a portion of the auger should be in contact with, or bear on, the tank bottom, that the auger should be so constructed and arranged that the turning of the auger on its axis will result in the crawling of the lower portion of the auger around in the bottom of the tank in the manner described and for the reasons described, thereby enabling the mixing action to be accomplished with an auger of simple and inexpensive construction, of relatively small diameter, operating in a tank of convenient size, and requiring only a small amount of power for its operation.

I claim:

1. In a feed mixer of the character described, a mixing tank having a side wall and bottom, a mixing auger, the upper portion of said auger positioned centrally and vertically in said tank, the lower portion of said auger extending over said tank bottom to said side wall and resting on and in constant contact with said tank bottom, means for rotating said auger, whereby rotation of said auger will cause said lower portion of said auger to crawl around on said tank bottom in the manner and for the purpose described.

2. The combination set forth in claim 1 with a ring at the bottom of the side wall of said tank, and with the bottom terminus of said auger exerting end thrust against said ring.

3. The combination set forth in claim 1 with the bottom of said side wall of said tank having a reduced diameter portion and with the bottom terminus of said auger engaging said reduced diameter portion.

4. The combination set forth in claim 1 with a grinding ring and supporting spider mounted on the upper portion of said auger and a cooperating stationary grinding element spaced a slight distance above said grinding ring, whereby the material delivered from the upper portion of said auger will pass through said spider and thence spread over said grinding ring and be subjected to grinding action before being discharged in the upper portion of said tank.

5. The combination set forth in claim 1 with a bearing sleeve supporting the upper portion of said auger and cooperating grinding rings supported on spiders mounted on said upper portion of said auger and said sleeve respectively, and means for adjusting the position of one of said grinding rings with respect to the other, whereby the material delivered from the upper portion of said auger will pass through the spider on said auger and then move in a radial direction out between said grinding rings before being discharged in the upper portion of said tank.

6. In a feed mixer of the character described, a mixing tank having a substantially cylindrical side wall and a bottom, a conically-shaped raised portion in said bottom, a mixing auger, the upper portion of said auger positioned centrally and vertically in said tank, the lower portion of said auger bending outwardly from the center of said tank and extending over said tank bottom and bearing on said tank bottom, means for rotating said auger, whereby rotation of said auger will cause said lower portion of said auger to crawl around on said tank bottom in the manner and for the purpose described.

7. In a feed mixer of the character described, a mixing tank having a side wall and a bottom, a mixing auger, the upper portion of said auger having a rigid core shaft positioned centrally and vertically in said tank, the lower portion of said auger connected with said shaft and extending over said tank bottom to said side wall and resting on and in constant contact with said tank bottom, means for rotating said core shaft of said upper portion of said auger, whereby rotation of said auger upper core shaft will cause said lower portion of said auger to crawl around on said tank bottom in the manner and for the purpose described.

8. The combination set forth in claim 7 with said lower portion of said auger including a spring helix of decreasing pitch towards the bottom extremity of said auger.

9. The combination set forth in claim 7 with said lower portion of said auger including a spring helix of decreasing outer diameter towards the bottom extremity of said auger.

10. The combination set forth in claim 7 with said lower portion of said auger having a flexible and resilient core shaft.

11. In a feed mixer of the character described, a mixing tank having a side wall and a bottom, a mixing auger, the upper portion of said auger positioned centrally and vertically in said tank, the lower portion of said auger extending over said tank bottom to said side wall and resting on and in constant contact with said tank bottom, means for rotating said auger, and means for causing the volume of material engaged by said auger to be increased inwardly along said auger with the rotation of said auger.

12. In a feed mixer of the character described, a mixing tank having a side wall and a bottom, a composite mixing auger, the upper portion of said auger positioned centrally and vertically in said tank, the lower portion of said auger bending outwardly from the center of said tank and extending over said tank bottom, said lower portion of said auger including a flexible auger section having a core and helical blade formed of flexible material, and a heavy auger section attached to the bottom end of said flexible auger section of sufficient weight to bear on the bottom of said tank at all times, whereby rotation of said auger will cause said lower portion of said auger to crawl around on said tank bottom in the manner and for the purpose described.

13. In a feed mixer of the character described, a mixing tank having a side wall and a bottom, a composite mixing auger, the upper portion of said auger positioned centrally and vertically in said tank, the lower portion of said auger bending outwardly from the center of said tank and extending over said tank bottom, said lower portion of said auger including a flexible auger section having a core and helical blade formed of flexible material.

14. In a feed mixer of the character described, a mixing tank having a side wall and bottom, a mixing auger, the upper portion of said auger having a shaft positioned centrally and vertically in said tank, the lower portion of said auger extending over said tank bottom to said side wall and resting on and in contact with said tank bottom, means for rotating said auger, a pair of cooperating grinding rings positioned near the top of said auger and coaxial with said auger shaft, whereby some of the material from said tank when thrown by centrifugal force from the top of said auger will be engaged by said grinding rings, stationary supporting means for one of said rings, means carried by said auger shaft for supporting the other of said rings and causing said latter mentioned ring to be rotated in unison with said shaft, and means for adjusting one of said rings with respect to the other in axial direction.

JONAS J. BYBERG.

References Cited in the file of this patent

UNITED STATES PATENTS

| Number | Name | Date |
|---|---|---|
| 685,217 | Miller et al. | Oct. 22, 1901 |
| 1,121,107 | Kress | Dec. 15, 1914 |
| 1,934,970 | Davis | Nov. 14, 1933 |
| 2,345,063 | Nauta | Mar. 28, 1944 |